US011335351B2

(12) United States Patent
Black et al.

(10) Patent No.: US 11,335,351 B2
(45) Date of Patent: *May 17, 2022

(54) COGNITIVE AUTOMATION-BASED ENGINE BOT FOR PROCESSING AUDIO AND TAKING ACTIONS IN RESPONSE THERETO

(71) Applicant: Bank of America Corporation, Charlotte, NC (US)

(72) Inventors: Christine D. Black, Belfast, ME (US); Jinna Kim, Charlotte, NC (US); Todd M. Goodyear, New Hope, PA (US); William August Stahlhut, The Colony, TX (US); Shola L. Oni, Atlanta, GA (US); Mardochee Macxis, Concord, NC (US)

(73) Assignee: Bank of America Corporation, Charlotte, NC (US)

( * ) Notice: Subject to any disclaimer, the term of this patent is extended or adjusted under 35 U.S.C. 154(b) by 221 days.

This patent is subject to a terminal disclaimer.

(21) Appl. No.: 16/817,843

(22) Filed: Mar. 13, 2020

(65) Prior Publication Data

US 2021/0287680 A1    Sep. 16, 2021

(51) Int. Cl.
*G10L 13/00* (2006.01)
*G10L 17/00* (2013.01)
(Continued)

(52) U.S. Cl.
CPC .............. *G10L 17/00* (2013.01); *G06F 17/18* (2013.01); *G06F 30/20* (2020.01); *G06N 5/043* (2013.01);
(Continued)

(58) Field of Classification Search
CPC . G10L 17/00; G10L 21/0232; G10L 21/0272; G10L 21/0364; G10L 15/26;
(Continued)

(56) References Cited

U.S. PATENT DOCUMENTS 9,626,442 B1 *   4/2017   Bunker ................. G06F 16/951
9,959,556 B1 *   5/2018   Cordell .................... H04L 67/24
(Continued)

OTHER PUBLICATIONS

X. Anguera, C. Woofers and J. Hernando, "Acoustic Beamforming for Speaker Diarization of Meetings," in IEEE Transactions on Audio, Speech, and Language Processing, vol. 15, No. 7, pp. 2011-2022, Sep. 2007, doi: 10.1109/TASL.2007.902460. (Year: 2008).*

*Primary Examiner* — Edgar X Guerra-Erazo
*Assistant Examiner* — Nandini Subramani
(74) *Attorney, Agent, or Firm* — Banner & Witcoff, Ltd.

(57) ABSTRACT

Aspects of the disclosure relate to cognitive automation-based engine processing on audio files and streams received from meetings and/or telephone calls. A noise mask can be applied to enhance the audio. Real-time speech analytics separate speech for different speakers into time-stamped streams, which are transcribed and merged into a combined output. The output is parsed by analyzing the combined output for correct syntax, normalized by breaking the parsed data into record groups for efficient processing, validated to ensure that the data satisfies defined formats and input criteria, and enriched to correct for any errors and to augment the audio information. Notifications based on the enriched data may be provided to call or meeting participants. Cognitive automation functions may also identify callers or meeting attendees, identify action items, assign tasks, calendar appointments for future meetings, create email distribution lists, route transcriptions, monitor for legal compliance, and correct for regionalization issues.

20 Claims, 7 Drawing Sheets

(51) Int. Cl.
*G06F 30/20* (2020.01)
*G06F 17/18* (2006.01)
*G06N 5/04* (2006.01)
*G10L 21/0272* (2013.01)
*G10L 21/0232* (2013.01)
*G10L 21/0364* (2013.01)
*G06N 20/00* (2019.01)
*G06F 111/10* (2020.01)

(52) U.S. Cl.
CPC ...... *G10L 21/0232* (2013.01); *G10L 21/0272* (2013.01); *G10L 21/0364* (2013.01); *G06F 2111/10* (2020.01); *G06N 20/00* (2019.01)

(58) Field of Classification Search
CPC ..... G10L 21/0208; G06F 17/18; G06F 30/20; G06F 2111/10; G06N 5/043; G06N 20/00; G06Q 30/01; H04M 3/56
See application file for complete search history.

(56) References Cited

U.S. PATENT DOCUMENTS

| | | | |
|---|---|---|---|
| 10,867,249 B1* | 12/2020 | Bosnjakovic | G06N 5/02 |
| 11,095,468 B1* | 8/2021 | Pandey | G06F 16/90324 |
| 2007/0206759 A1* | 9/2007 | Boyanovsky | H04M 3/56 |
| | | | 379/202.01 |
| 2010/0174720 A1* | 7/2010 | Mack | G06F 16/22 |
| | | | 707/812 |
| 2011/0002763 A1 | 11/2011 | Rathod | |
| 2015/0106091 A1* | 4/2015 | Wetjen | G10L 15/26 |
| | | | 704/235 |
| 2015/0379429 A1* | 12/2015 | Lee | G06N 20/00 |
| | | | 706/11 |
| 2016/0050320 A1* | 2/2016 | Montenegro | H04M 3/523 |
| | | | 379/265.09 |
| 2017/0001165 A1 | 4/2017 | Deodhar et al. | |
| 2019/0304470 A1* | 10/2019 | Ghaemmaghami | G10L 17/06 |
| 2020/0394649 A1* | 12/2020 | Daly | G06Q 20/308 |

* cited by examiner

COGNITIVE AUTOMATION-BASED ENGINE BOT FOR PROCESSING AUDIO AND TAKING ACTIONS IN RESPONSE THERETO

TECHNICAL FIELD OF DISCLOSURE

Aspects of the disclosure relate to processes, machines, and platforms for data processing, artificial intelligence and, in particular, to knowledge processing of collections of facts, data, information, and relationships to which reasoning techniques are applied in order to utilize cognitive automation to perform functions in conjunction with real-time speech analytics and related processing of audio acquired during meetings and/or telephone or other calls.

BACKGROUND

There are currently technical needs for improvements in real-time and/or subsequent processing of audio streams and recordings from meetings and telephone calls in order to, inter alia: capture data from customer interactions; manage big data; predict behavior from call and meeting participants; communicate with customers and meeting participants; monitor performance of customer service representatives; identify call and meeting types and pass data to relevant channels and individuals; predict needs of customers and meeting participants; provide automated responses to customer or meeting participant inquiries; accurately transcribe calls and meetings where there are multiple speakers and participants; provide security against fraud; ensure compliance with local laws, regulations, norms, and best practices; and/or automatically handle action items and scheduling resulting from calls and meetings.

For example, in the context of recorded meetings, it is often desirable to have an accurate transcription of the meeting for future reference for meeting participants and for individuals who were unable to participate in the call. Currently, such meetings need to be recorded manually and then be transcribed manually by clerical personnel. Such human transcriptions are prone to inaccuracies and are time consuming to generate, especially when there are multiple participants. Further, action items from the meetings and future calendar events often need to be separately created, separately investigated, and manually followed up on. Again, this results in delays, omissions, and/or conflicts due to misunderstandings or people who misremember aspects of the meeting. Moreover, discussions or proposed action items may, without the knowledge of any participant, be contrary to established laws, regulations, norms, or company best practices.

Additionally, in the context of telephone or other calls, customers expect high quality customer service in view the fact that companies often already have acquired significant amounts of personal information. One frustration that customers often face is having to repeat their details on multiple occasions when calling in, or they may receive an odd offer from the company that is completely unrelated to them. When these things happen, dissatisfaction starts to set in. In order to tackle this, there is a need to eliminate redundant customer and employee effort by capturing, analyzing, cross-referencing, and sharing information applicable information across platforms and channels without being intrusive. Relatedly, customer service interactions needed to be tailored based on restrictions such as whether a customer is on a do not call list, which may limit what the representative can say to the customer during the call.

Regarding predicting behavior, without early insight by customer service representatives on the phone, they are unable to handle emerging customer needs and expectations effectively. This makes it difficult to retain customers who might be about to defect. It also makes it difficult to up-sell to customers who are looking for information about a new topic.

Without being able to spot trends in customer data, customer service representatives are not able to model best practices and predict the outcomes or the consequences of a particular course of action. It is also desirable to monitor advisor and customer speech to provide live feedback to advisors, team leaders and quality assurance teams about what is being said, as well as how it is being said. It is further desirable to monitor stress levels, speech clarity and script adherence, all while the call is in progress. Further, a common challenge facing many companies today is the ability to make sense of unstructured data in the form of customer complaints and inquiries accurately and efficiently. Furthermore, there is a need to be able to listen into the content of a call and effectively search for and provide the advisor with missing information to give to the customer in real-time.

This disclosure addresses one or more of the shortcomings in the industry to overcome the fundamental limitations associated unrecorded meetings and telephone calls, and the technical problems associated with attempting to process audio and automatically acting in response to audio files or streams from recorded meetings and calls, by use of cognitive automation computing machines to perform functions in conjunction with real-time speech analytics, related processing of audio, and post-processing cognitive automation functions.

SUMMARY

Aspects of the disclosure provide effective, efficient, scalable, and convenient technical solutions that address and overcome the technical problems associated with capturing data from customer interactions; managing big data; predicting behavior for call and meeting participants; communicating with customers and meeting participants; monitoring performance of customer service representatives; identifying call and meeting types and pass data to relevant channels and individuals; predicting needs of customers and meeting participants; providing automated responses to customer or meeting participant inquiries; accurately transcribing calls and meetings where there are multiple speakers and participants; providing security against fraud; ensuring compliance with local laws, regulations, norms, and best practices; and/or automatically handling action items and scheduling resulting from calls and meetings, by utilizing cognitive automation in inventive processes, machines, and platforms.

In some embodiments, a cognitive automation computing platform for processing audio from an audio source containing speech from a plurality of speakers can include a server computing machine, which has at least one server processor; at least one server communication interface communicatively coupled to the at least one server processor; and server memory communicatively coupled to the server communication interface. The server memory can store server computer-readable instructions that, when executed by the at least one server processor, cause the server computing machine to perform various functions.

The at least one server processor can receive, from the audio source via the at least one server communication interface, the audio, which can be stored in a first server sector of the server memory. A noise mask can be applied on the audio by the at least one server processor to create an enhanced audio signal, which can be stored in a second server sector of the server memory. The at least one server processor can utilize real-time speech analytics on the enhanced audio signal to separate speech corresponding to each of the plurality of speakers into a plurality of time-stamped streams, which can be stored in a third server sector of the server memory. The at least one server processor can transcribe the plurality of time-stamped streams into separate transcriptions corresponding to said plurality of speakers, which can be stored in a fourth server sector of the server memory. The at least one server processor can merge the separate transcriptions into a combined output based on the time-stamped streams, and store the output in a fifth server sector of the server memory. The at least one server processor can parse the combined output into parsed data by analyzing the combined output for correct syntax, and can store the parsed data in a sixth server sector of the server memory. The at least one server processor can normalize the parsed data into normalized data by breaking the parsing data into record groups for efficient processing. The data may be normalized into a first form, a second form, a third form, a fourth form, a fifth form, and/or a sixth form. And, the normalized data can be stored by the at least one server processor in a seventh server sector of the server memory. The normalized data can be validated, by the at least one server processor, into validated data to ensure that the validated data satisfies defined formats and input criteria, and stored in an eighth server sector of the server memory. The at least one server processor can enrich the validated data to correct for any errors and to augment the audio with additional pertinent information. The enriched data can be stored in a ninth server sector of the server memory. One or more other cognitive automation functions, as described herein, can be performed by the at least one server processor, based on the enriched data.

In some embodiments, the audio can be received and/or processed in real-time.

In some embodiments, the audio can be provided from a meeting based on one or more microphones in meeting rooms, by feeds from video conferencing, and/or by telephony devices from participants calling into the meeting. In other embodiments, the audio can be provided by audio streams between customer service representatives and customers conversing over a telephone.

In some embodiments, cognitive automation functions can include automatically identifying, by the at least one server processor from the enriched data, participants in the meeting; creating, by the at least one server processor based on the enriched data, an email distribution list for the identified participants; automatically routing, by the at least one server processor over the at least one communication interface, said combined output to said participants by email based on the enriched data; automatically identifying, by the at least one server processor based on the enriched data, at least one action item for one of said identified participants; and/or automatically routing, by the at least one server processor over the at least one communication interface, said at least one action item to said one of said identified participants by email.

In some embodiments, where the audio is from a telephone call between a customer service representative and a customer, cognitive automation functions can include automatically generating, by the at least one server processor from the enriched data, a notification corresponding to the telephone call. The notification could relate to account information, an upsell opportunity, information that could help build a rapport with the customer, information requested by the customer, legal or regional alerts, or provide other relevant information or the like.

In some embodiments, a cognitive automation computing platform may also include a client computing machine having: at least one client processor; at least one client communication interface communicatively coupled to the at least one client processor; at least one client monitor or display communicatively coupled to the at least one client communication interface; and client memory communicatively coupled to the client communication interface. The client memory may store client computer-readable instructions that, when executed by the at least one client processor, cause the client computing machine to perform various functions. The at least one client processor can receive a notification over the at least one client communication interface from the at least one server processor via the at least one server communication interface. The notification can be stored in a first client sector of client memory. The at least one client processor can display the notification on the at least one client monitor.

In some embodiments, one or more different methods can be used to validate normalized data by the at least one server processor. Data can be validated by forecast validation based on prognostic output from at least one numerical model, by regression validation by determine whether an output of a regression model is adequate, by social validation to verify compliance in a social activity, by statistical model validation to determine with outputs of a statistical model are acceptable, by documenting that a process meets predetermined specifications and fulfills an intended purpose, and/or by checking whether the normalized data follows a defined structure.

In some embodiments, one or more non-transitory computer-readable media can store instructions that, when executed by a cognitive automation computing platform comprising a plurality of processors in a client-server architecture communicatively coupled over a private network via a plurality of communication interfaces, cause the cognitive automation computing platform to perform various functions. A first of the plurality of processors can receive audio from a data source that can be stored in a first sector of the computer-readable media. The first of the plurality of processors can apply a noise mask on the audio to create an enhanced audio signal. The first of the plurality of processors can store, in a second sector of the computer-readable media, the enhanced audio signal. The first of the plurality of processors can utilize real-time speech analytics on the enhanced audio signal to separate said speech corresponding to each of the plurality of speakers into a plurality of time-stamped streams. The first of the plurality of processors can store, in a third sector of the computer-readable media, the plurality of time-stamped streams. The first of the plurality of processors can transcribe the plurality of time-stamped streams into separate transcriptions corresponding to said plurality of speakers. The first of the plurality of processors can store, in a fourth sector of the computer-readable media, the separate transcriptions.

The first of the plurality of processors can merge the separate transcriptions into a combined output based on the time-stamped streams. The first of the plurality of processors can store, in a fifth sector of the computer-readable media, the combined output. The first of the plurality of processors can parse the combined output into parsed data by analyzing the combined output for correct syntax. The first of the plurality of processors can store, in a sixth sector of the computer-readable media, the parsed data. The first of the plurality of processors can normalize the parsed data into normalized data by breaking the parsing data into record groups for efficient processing. The data may be normalized into a first form, a second form, a third form, a fourth form, a fifth form, and/or a sixth form. And, the normalized data can be stored by the first of the plurality of processors in a seventh sector of the computer-readable media. The first of the plurality of processors can validate the normalized data into validated data to ensure that the validated data satisfies defined formats and input criteria. The first of the plurality of processors can store, in an eighth sector of the computer-readable media, the validated data. The first of the plurality of processors can enrich the validated data to enriched data that is corrected for any errors and can be augmented with other relevant information. The first of the plurality of processors can store, in a ninth sector of the computer-readable media, the enriched data. The first of the plurality of processors can perform at least one cognitive automation function, such as any described herein or to generate a notification based on the enriched data. The first of the plurality of processors can store, in a tenth sector of the computer-readable media, the notification, and can transmit it to a second of the plurality of processors, which can display the notification on a monitor or other display device.

In some embodiments, cognitive automation-based method(s) for processing audio from an audio source containing speech from a plurality of speakers can be implemented. The method(s) may include one or more of the foregoing steps or functions. And, one or more of the steps may be performed in real-time.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
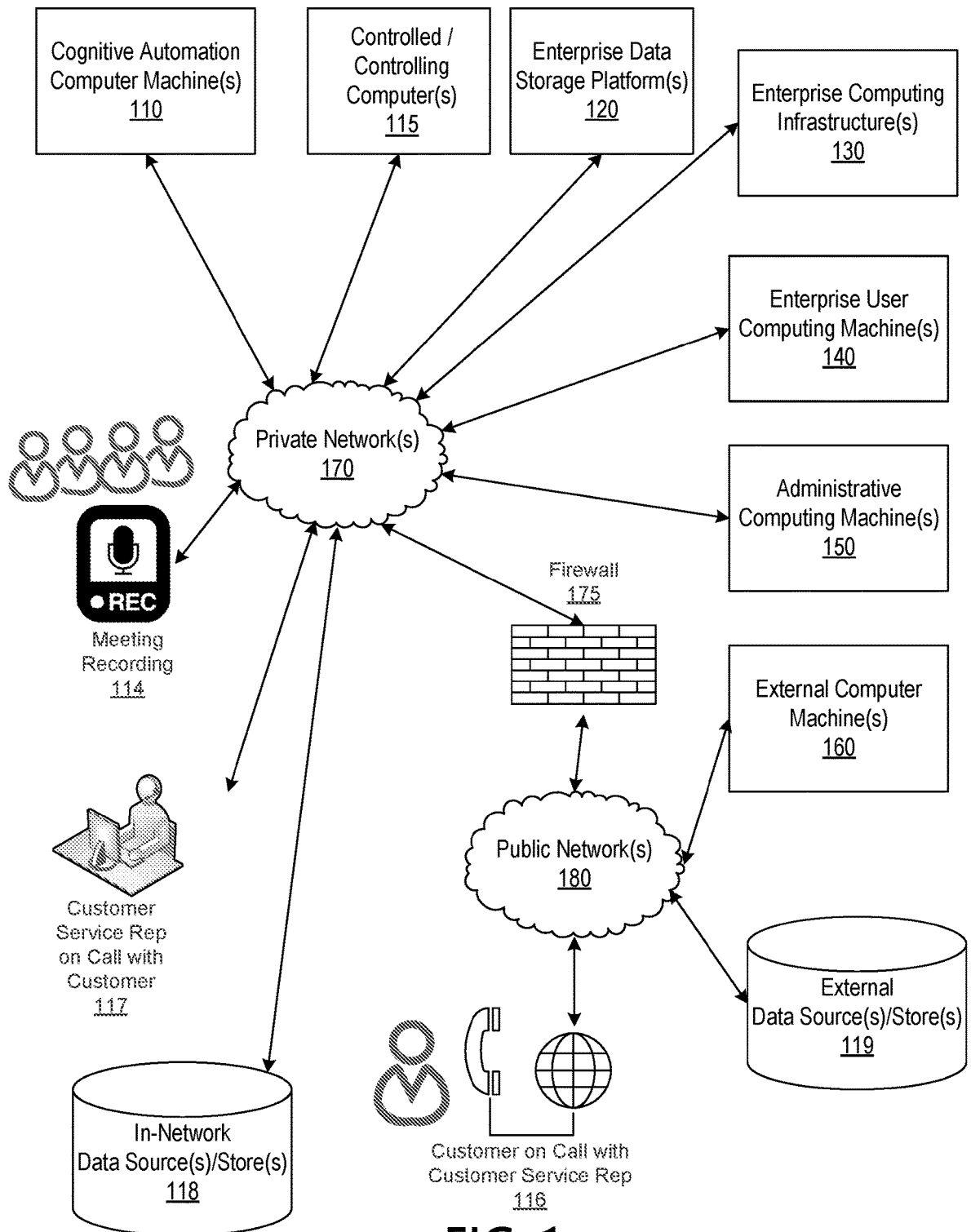
FIGS. 1 and 2 depict illustrative computing environment(s), client-server configurations, cognitive automation computer machines, platform(s), and/or module(s), in accordance with one or more environments, for processing audio from disparate sources (such as speakers on a conference call or participants talking during a meeting) and using bot(s), in real-time or at subsequent periods of time, to perform cognitive automation analysis on audio inputs and take actions or make recommendations based on the analysis and, additionally if desired, also based on historical data on which the bot(s) have been trained or in view of data referenced as part of the analysis.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, bot(s) (implemented in software), daemons, emails, encryptions, databases and data structures (including cubes, hypercubes, data warehouses, multidimensional databases, multidimensional database management systems, multidimensional data structures, online analytical processing (OLAP) applications, cubes and data storage, relational databases, etc.), datasets, data sources, drivers, file systems or distributed file systems, firmware, graphical user interfaces, images, instructions, machine learning, middleware, modules, objects, operating systems, processes, protocols, programs, scripts, tools, and utilities. The computer-executable software and data is on tangible, computer-readable memory (local, in network-attached storage, remote, and/or online), can be stored in volatile or non-volatile memory, and can operate automatically and/or autonomously, based on event triggers, on-demand, on a schedule, and/or as part of batch processing. It can operate in real time or otherwise.

"Computer machine(s)" and "cognitive automation machine(s) and/or platform(s") can include one or more: special-purpose bot(s) (implemented in hardware), special-purpose network-accessible administrative computers, clusters, computing devices or computing machine(s), computing platforms, desktop computers, distributed systems, enterprise computers, laptop or notebook computers, controlling computers, nodes, personal computers, portable electronic devices, servers, controlled computers, smart devices, tablets, and/or workstations, which have one or more microprocessors, cores, and/or executors such as for executing or accessing the computer-executable software and data. References to computer machines, bots, and names of devices included within this definition are used interchangeably in this specification and are not considered to be limiting or exclusive to only a specific type of device or type of user. Instead, references in this disclosure to computer machines, platforms, bots, and the like are to be interpreted broadly as understood by skilled artisans. Further, as used in this specification, computer machines also include all hardware and components typically contained therein such as, for example, processors/executors/cores 111, volatile and non-volatile memories 112 as well as modules and/or data stored therein, communication interfaces 113, monitor(s) (not shown), microphone(s) (not shown), speaker(s) (not shown), audio input(s) (not shown), and keyboards (not shown) or other input devices (not shown) etc.

Volatile and non-volatile memories may be comprised of one or more computer-readable media containing a plurality of sectors. As used herein, a "sector" is broadly defined as subdivision(s) or block(s) of memory and is not limited to the minimum storage unit of a hard drive or other computer-readable medium. Further, the sector may have a fixed size or may be variable.

Computer "networks" can include one or more local area networks (LANs), wide area networks (WANs), voice over IP (VoIP) networks or communications, the Internet and public networks 180, wireless networks, digital subscriber line (DSL) networks, frame relay networks, asynchronous transfer mode (ATM) networks, private networks 170, virtual private networks (VPN), or any combination of any of the same. Networks also include associated "network equipment" such as access points, ethernet adaptors (physical and wireless), firewall(s) 175, hubs, modems, routers, security devices, switches, and telephony devices, located inside the network and/or on its periphery, as well as software executing on any of the foregoing.

FIG. 1 depicts a various aspects of an illustrative computing environment(s) as well as cognitive automation computer machine(s), platform(s), internal and external computer machine(s), in-network and external data source(s)/data store(s), telephone call(s), meeting(s), recording(s), etc., in accordance with one or more environments, for processing audio from disparate sources (such as speakers on a conference call or participants talking during a meeting) and using bot(s), in real-time or at subsequent periods of time, to perform cognitive automation analysis on audio inputs (or other non-audio digital data) and take actions or make recommendations based on the analysis and, additionally if desired, also based on historical data on which the bot(s) have been trained or in view of data referenced as part of the analysis.

Referring to FIG. 1, computing environment/computing platform(s) 100 may include one or more computer machine(s), system(s), and/or platform(s). For example, computing environment 100 may include various computer machine(s) such as one or more cognitive automation computer machine(s) 110, controlling computers and/or controlled computers 115 for distributed processing, enterprise data storage platform(s) 120, enterprise computing infrastructure 130, enterprise user computing machine(s) 140, administrative computing machine(s) 150, and external computer system(s) 160 for remote access and/or processing, or performing any other functions or actions. In addition, client-server arrangements may be implemented using one or more of the foregoing. For example, the cognitive automation computer machine(s) 110 could be implemented as one or more server(s) to provide services and functions to one or more client machines such as enterprise user computing machine(s) 140, administrative computer machine(s) 150, external computer system(s) 160, one or more other infrastructures, and the like, or users of any one or more of the foregoing such as customer service representatives 117. Similarly, cognitive automation computer machine(s) could monitor and/or act on, in real-time or otherwise audio or other inputs from meeting recording(s) 114 or telephone call(s) between customer service representative(s) 117 and customers 116.

As illustrated in greater detail below, each element in computing environment 100 may include one or more computing machine(s) and associated components operating computer software and data configured to perform one or more of the functions described herein. Moreover, the functions performed by one machine or platform could be implemented on another machine or platform in the environment in accordance with one or more various embodiments of this disclosure. Computing environment 100 also includes one or more in-network data sources/data store(s) 118 which may contain applications or other computer software and data. Computing environment 100 may also include one or more external data sources/data stores 119, which may also contain applications or other computer software and data. The data stores 118 and 119 may contain any type of company information, regulatory information, customer information, or the like, such as data pertaining to sales, inventory, marketing, supplies, calendars, scheduling, accounting, human resource, CRM, ERP, legal, regulatory, and/or any other type of data to be maintained in any type of data store or application. The data stores may be coupled to and accessible from a network such as, for example, by a network-attached storage medium and/or device. Additionally or alternatively, the data stores 118 and 119 may be implemented, in whole or in part, internally as part of one or more of any of cognitive automation computer machine(s) 110, controlling computers and/or controlled computers 115 for distributed processing, an enterprise data storage platform 120, enterprise computing infrastructure 130, an enterprise user computing machine 140, an administrative computing machine 150, and an external computer system 160.

In addition, and as illustrated in greater detail below, cognitive automation computer machine(s) 110, controller and controlled computing machine(s) 115, enterprise computer infrastructures 130, and enterprise user computing machine(s) 140, may be configured to perform various audio processing functions described herein such as noise masking, separating speech, identifying users, transcribing speech, merging transcriptions, handling combined outputs, storing data, and distributing and/or sharing data. Additionally, and as illustrated in greater detail below, cognitive automation computer machine(s) 110, controller and controlled computing machine(s) 115, enterprise computer infrastructures 130, and enterprise user computing machine(s) 140, may be configured to perform other cognitive automation functions described herein such as retrieving audio or data, and parsing, segmenting, processing, normalizing, storing, accessing, validating, analyzing, distributing, enriching, propagating, and/or otherwise acting on any audio inputs or other data.

Enterprise computing infrastructure 130 may include one or more computer machines and/or other computer components. In addition, and as illustrated in greater detail below, enterprise computing infrastructure 130 may be configured to provide various enterprise and/or back-office computing functions for an organization, such as a financial institution. For example, enterprise computing infrastructure 130 may include various computer machines and/or computer-executable software and/or data that store and/or otherwise contain account information, such as financial account information including account balances, transactions, transaction history, account owner information, identifications as to account limitations such as do not call list registrations, and/or other information. In addition, enterprise computing infrastructure 130 may process and/or otherwise execute transactions on specific accounts or from various users based on commands and/or other information received from other computer systems included in computing environment 100. Additionally or alternatively, enterprise computing infrastructure 130 may load data from enterprise data storage platform 120 or another data store, manipulate and/or otherwise process such data, and return modified data and/or other data to enterprise data storage platform 120 and/or to other computer machines or systems included in computing environment 100.

Cognitive automation computer machine(s) 110 may be any type of computer machine and may be linked to and/or used by a specific enterprise user (who may, e.g., be an employee, customer, or affiliate of an enterprise organization tasked with entering data, updating data, and/or propagating data). Enterprise user computing device 140 may be any type of computer machine and may be linked to and/or used by a specific enterprise user (who may, e.g., be an employee or other affiliate of an enterprise organization controlling and/or interacting with controlling and controlled computing device(s) 115 or any other computer machines). Administrative computing device 150 may be any type of computer machine and may be linked to and/or used by an administrative user (who may, e.g., be a network administrator of an enterprise organization controlling and/or interacting with controlling and controlled computing device(s) 115 or any other computer machines). Enterprise computer system 160 may be any type of computer machine and may be linked to and/or used by one or more external users (who may, e.g., not be associated with an enterprise organization controlling and/or interacting with controlling and controlled computing device(s) 115 or any other computer machines).

Cognitive automation as used herein is a subset of artificial intelligence—using specific AI techniques that mimic that way the human mind works—to assist humans in propagating data including entering data, making decisions, completing tasks, or meeting goals. In the context of the present disclosure, this means using technologies such as natural language processing, image processing, pattern recognition, and contextual analyses to make automated and more intuitive leaps, perceptions, and judgments, and automatically learn, discover, and make recommendations or predictions, all of which obviates the need for repetitive data entry into multiple systems. In particular, unstructured data can be used to build relationships and/or otherwise act on or propagate appropriate information captured from the unstructured data. This allows the cognitive automation engine to determine if something has been seen before and if so, where; what was done in the similar instance; is it connected to and/or related to something that has been seen before; what is the strength of the connection; and what was involved. Further, the cognitive automation engine such as in cognitive automation machine(s) 110 and/or hosted and executed on servers performing one or more of the cognitive automation functions can be pretrained to automate specific business processes and data entry, and thus need less data before actions can be taken, avoid requiring help from data scientists and/or IT professionals to build elaborate models. As such, the cognitive automation engine can be implemented in a client-server architecture or on a standalone machine in one or more embodiments of this disclosure, and can be used by business owners themselves and can be operational in just a few weeks. As new data is added to the cognitive automation system, the system can make more and more connections. This allows the cognitive automation system to keep learning unsupervised, and constantly adjust to the new information being fed and analyzed. Importantly, one or more aspects of the cognitive automation engine of this disclosure can capture data, process it, propagate it, and make decisions in real time.

Computing environment 100 also may include one or more networks, which may interconnect one or more of cognitive automation computer machine(s) 110, controlling and controlled computer machine(s) 115, in-network data source(s)/store(s) 118, external data source(s)/store(s) 119, enterprise data storage platform 120, enterprise computing infrastructure 130, enterprise user computing device 140, administrative computing device 150, external computer system 160, customer service representatives 117, and customers 116.

Computing environment 110 may include one or more firewalls 175, which protect or filter data for machines, platforms, data and the like, inside the private network from unauthorized users or processes operating outside the private network.

In one or more arrangements, computer machine(s) and the other system(s) included in computing environment 100 may be any type of computing device(s) capable of providing a user interface, receiving input via the user interface or from an audio source, acting on the input, accessing or processing data, taking actions based on inputs and data, controlling other computer machine(s) and/or component(s) thereof based on the input, communicating the received input to one or more other computing machine(s), and propagating data to other machine(s), platform(s), system(s), data source(s)/data store(s), and the like. As noted above, and as illustrated in greater detail below, any and/or all of the computer machine(s) of computer environment 100 may, in some instances, be special-purpose computing device(s) configured to perform specific functions.

Figure 2:
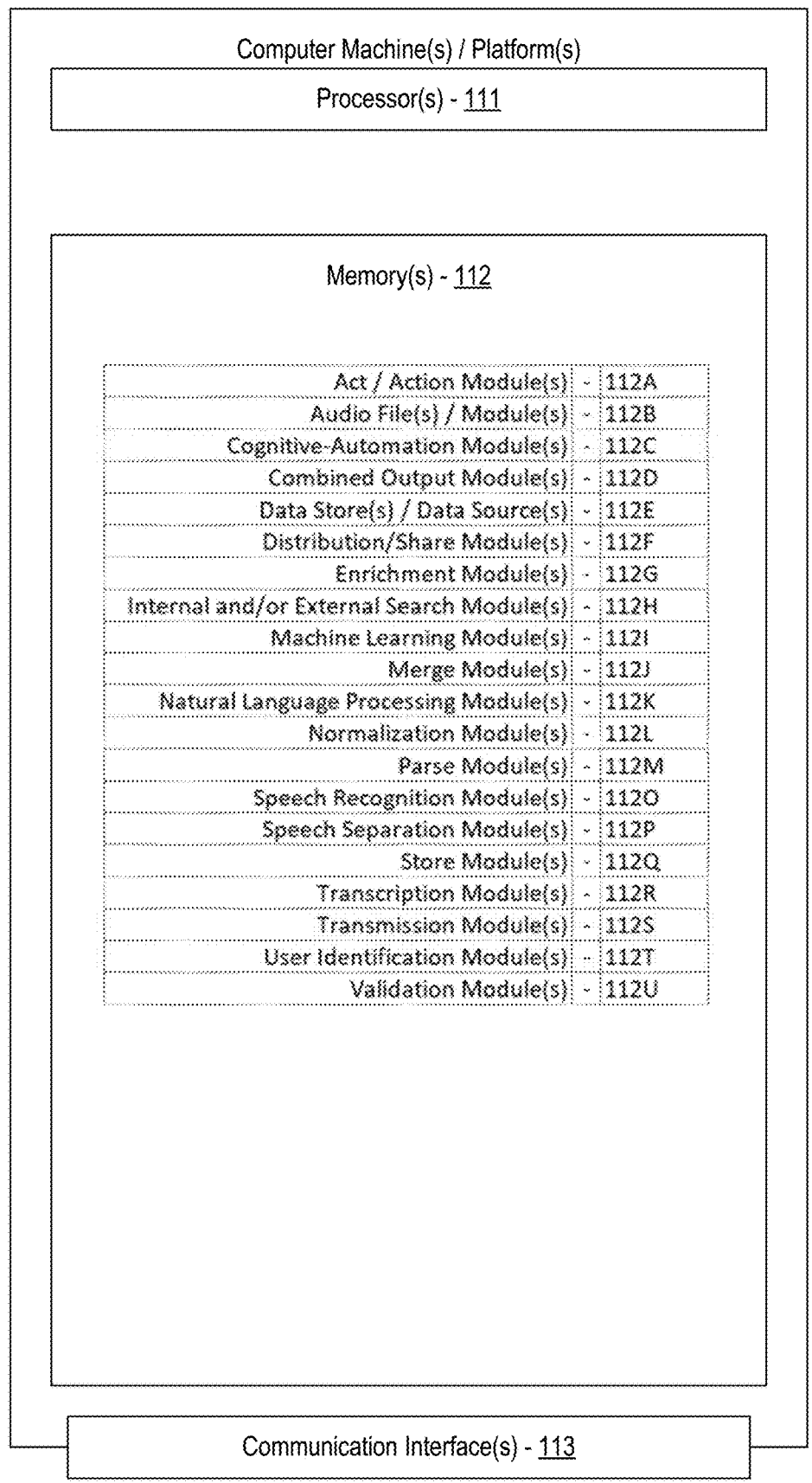

Referring to FIG. 2, one or more computer machine(s) or platform(s), such as, for example, cognitive automation machine 110, may include one or more processors, executors, cores, etc. 111, memory 112 (and modules or stores contained therein), and communication interface 113. A data bus may interconnect processor 111, memory 112, and communication interface 113. Communication interface 113 may be a network interface configured to support communication between one or more computer machines in computer environment 100 and one or more networks (e.g., private network 170, public network 180, or the like). Communication interface 113 may also accept audio inputs from telephony devices, microphones, or audio files.

Memory 112 may be volatile or non-volatile, and may include computer software and data such as, for example, one or more program modules having instructions that when executed by processor 111 cause a computer machine, such as cognitive automation computer machine(s) 110, to perform one or more functions described herein and/or access, process, analyze, manipulate, interact with, perform data acquisition, and/or control one or more data stores or data warehouses, big data, or other file systems that may store and/or otherwise maintain information which may be used by such program modules and/or processor 111. In some instances, one or more program modules, data, and/or databases may be stored by and/or maintained in different memory units (local or accessible across the network) of computer machines and/or by different computing devices that may form and/or otherwise make up a collection of computer machines.

Sample program modules, data, and/or databases stored or maintained in memory may include, but are not limited to: Act/Action Module(s) 112A (e.g., for executing cognitive automation actions); Audio File(s)/Modules 112B (e.g., containing audio or for handling audio); Cognitive Automation Module(s) 112C (e.g., for performing general cognitive automation functions as known in the industry); Combined Output Module(s) 112D (e.g., for combining the text output of transcribed statements, calls, or recordings); Data Store(s)/Data Source(s)/Data Warehouse(s) 112E (e.g., data repositories or sources of digital data, regulations, account information, etc.); Distribution/Share Module(s) 112F (e.g., for distributing data, displaying data, or routing data); Enrichment Module(s) 112G (e.g., for enriching validated data based on accessed data store(s) or data source(s) or the like); Internal and/or External Search Module(s) 112H (e.g., to facilitate searching and extraction of data); Machine Learning Module(s) 112I (e.g., code to perform tasks without using explicit instructions such as with supervised learning, semi-supervised learning, and unsupervised learning); Merge Module(s) 112J (e.g., for merging transcriptions); Natural Language Processing Module(s) 112K (e.g., for automatic manipulation and automatic computational processing of natural language like speech and text by software); Normalization Module(s) 112L (e.g., for normalizing parsed data); Parse Module(s) 112M (e.g., for parsing unstructured or other data); Speech Recognition Module(s) 112O (e.g., to recognize speech and language in digital representations of spoken data such as in recorded telephone calls or recorded meetings including, but not limited to, use of real-time speech analytics); Speech Separation Module(s) 112P (e.g., for separating out speech from different meeting and telephone speakers); Store Module(s) 112Q (e.g., for handling input from and output to computer-readable media); Transcription Module(s) 112R (e.g., for transcribing audio); Transmission Module(s) 112S (e.g., for transmitting data or audio to machines or components across network or communication channels); User Identification Module(s) 112T (e.g. for identifying different speakers in a meeting or on a call); and Validation Module(s) 112U (e.g., for validation of data). Other modules or functionality discussed herein (not shown) may also be included as additional modules in memory 112.

Figure 3:
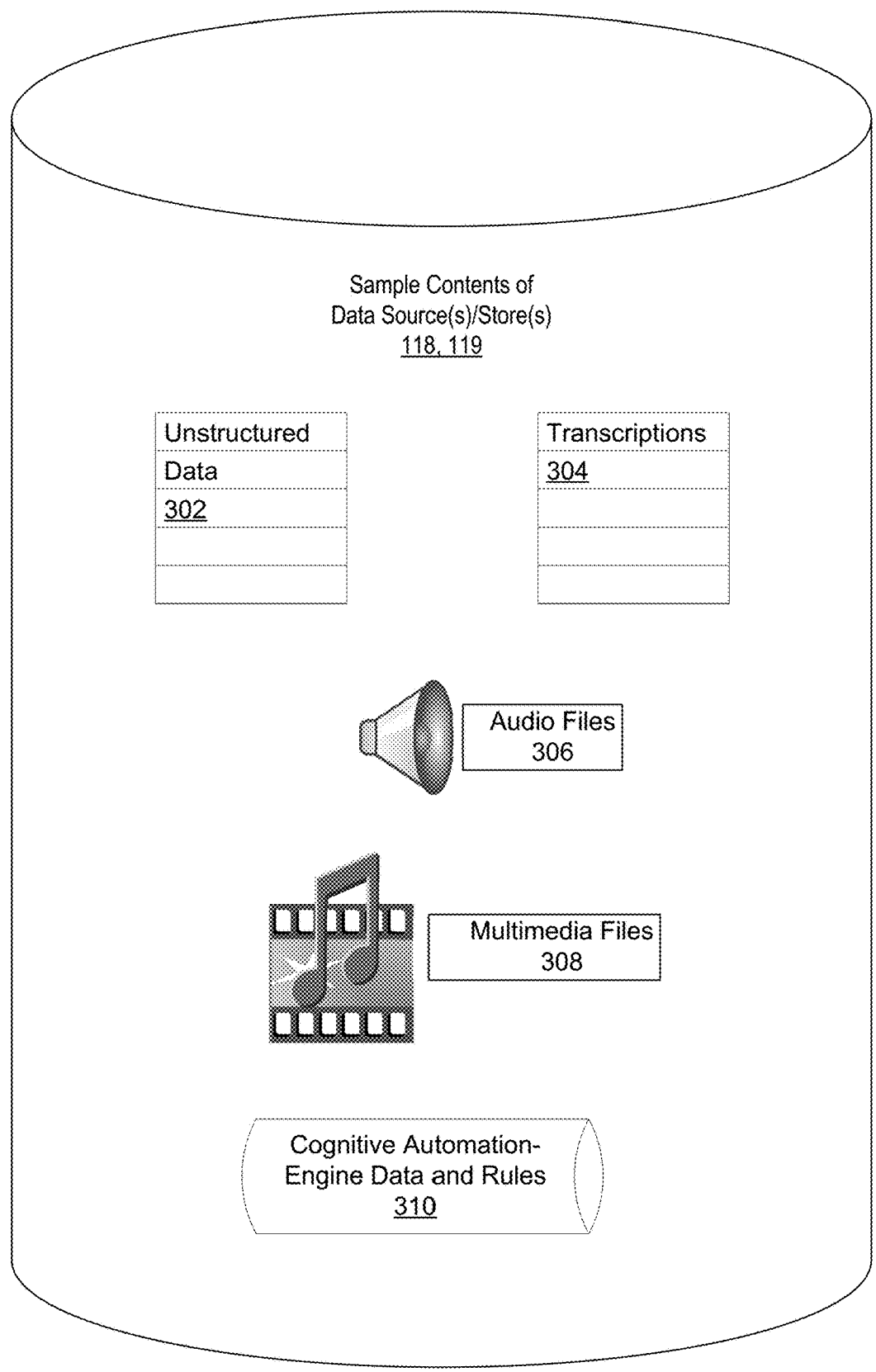
FIG. 3 depicts sample contents of data sources and/or data stores, in accordance with one or more environments, for processing data from disparate sources and utilizing audio inputs and data as part of a cognitive automation analysis.

Referring to FIG. 3, digital data and information in any documents, files or the like in memory (e.g., in-network or external data source(s)/store(s) 118 and 119) can be accessed by cognitive automation computer machine(s) as one or more inputs and/or can be written to, by the cognitive automation computer machine(s), in order to utilize, act on, and/or propagate data from one source to one or more other data source(s)/data store(s) (e.g., in-network or external data source(s)/store(s) 118 and 119). The digital data and information may include unstructured data 302, transcriptions 304, raw or processed audio files or streams 306, raw or processed multimedia files or streams 308, and/or cognitive automation-engine data or rules 310 contained in databases or other data structures.

Figure 4:
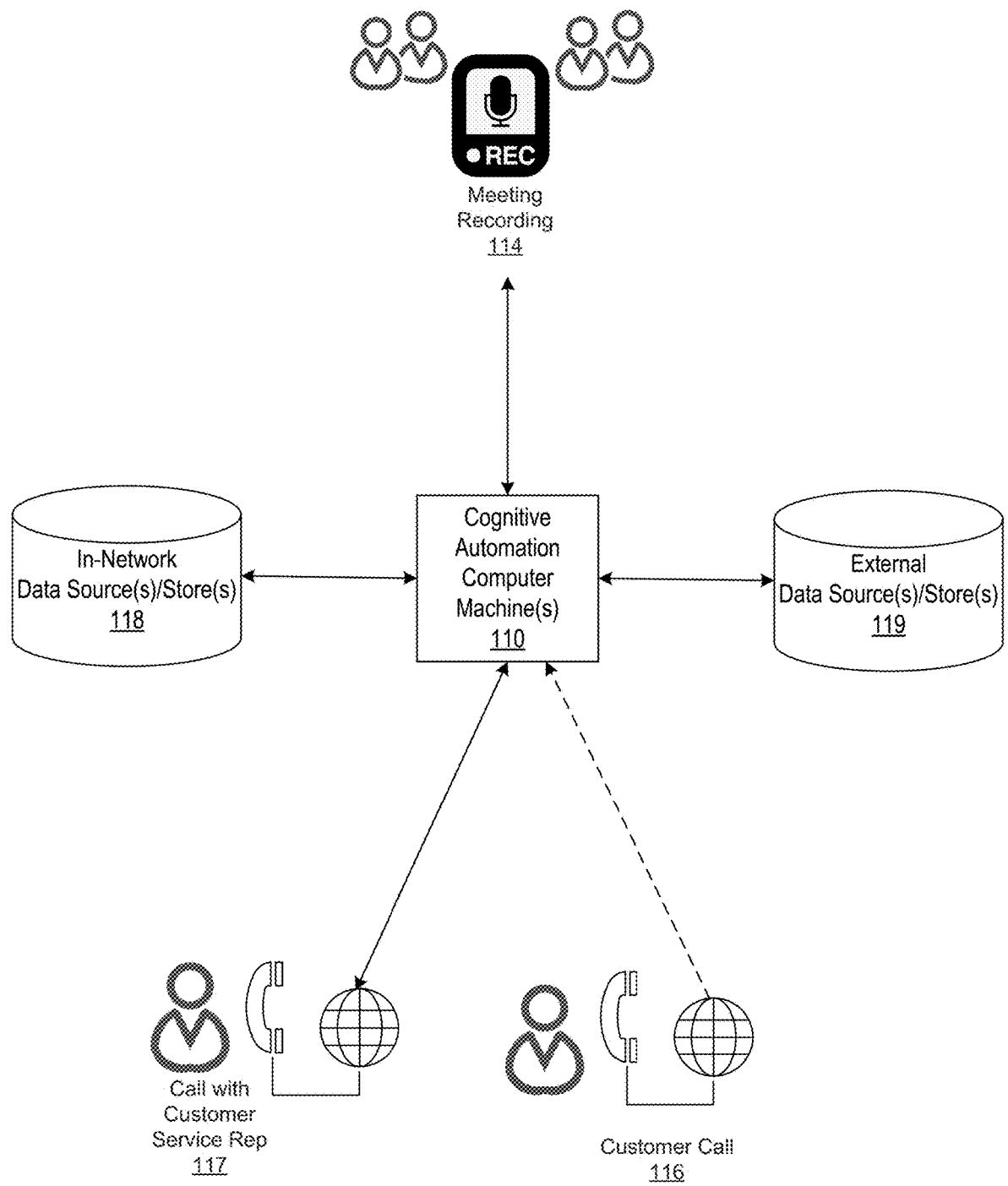
FIG. 4 depicts a sample functional overview of and information propagation between data sources/data stores (or applications contained therein) and cognitive automation computer machines, platforms, and/or modules, in accordance with one or more environments, for using cognitive automation to process audio inputs, performing analysis based on the inputs and historical data, and/or take actions or make recommendations based on the inputs and historical data.

Referring to FIG. 4, data source(s)/store(s) 118 and 119 may contain any type of digital data or information stored in isolation and/or across multiple systems or stores. Meeting recording(s) or streams 114 can be fed to cognitive automation computer machine(s) 110 and meeting participants can receive real-time or other feedbacks or actions from the cognitive automation computer machine(s) 110. Similarly, call recording(s) or streams 114 can be fed to cognitive automation computer machine(s) 110, and customer service representatives and/or callers can receive real-time or other feedbacks or actions from the cognitive automation computer machine(s) 110.

Figure 5:
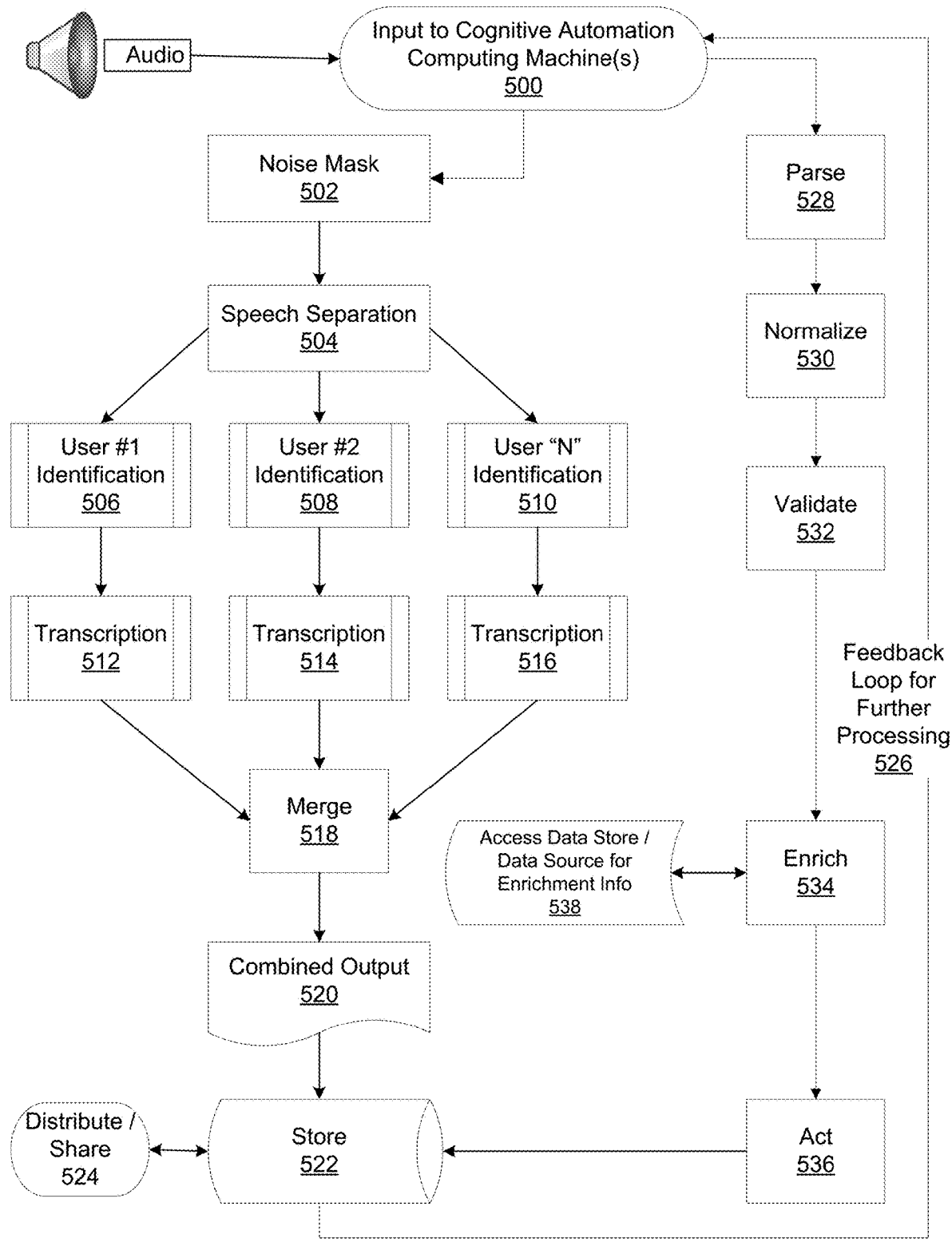
FIG. 5 depicts sample high-level representation(s) of the flow of algorithm(s) to implement various aspects of the cognitive automation bot(s), in accordance with one or more embodiments.

Referring to FIG. 5, audio files or streams (real-time or otherwise) can be input in step 500 to cognitive automation machine(s) 110. The cognitive automation computing machine(s) 110 can apply a noise mask to the audio file or stream in step 502 in order to remove background noise or enhance the quality of the audio feed. Using real-time or other speech analytics, the cognitive automation computing machine(s) 110 can separate speech from multiple speakers into separate audio streams in step 504. Using real-time or other speech analytics, the cognitive automation computing machine(s) 110 can then identify each separate user (e.g., steps 506, 508, 510) based on pre-seeded information regarding voice information from each user or on simply generic identifications of different user voice patterns). As an example of pre-seeding, each user may identify himself or herself at the beginning of a meeting or a call as part of standard introductions. These introductions can be used to train identification processes in accordance with one or more embodiments disclosed herein.

Figure 6:
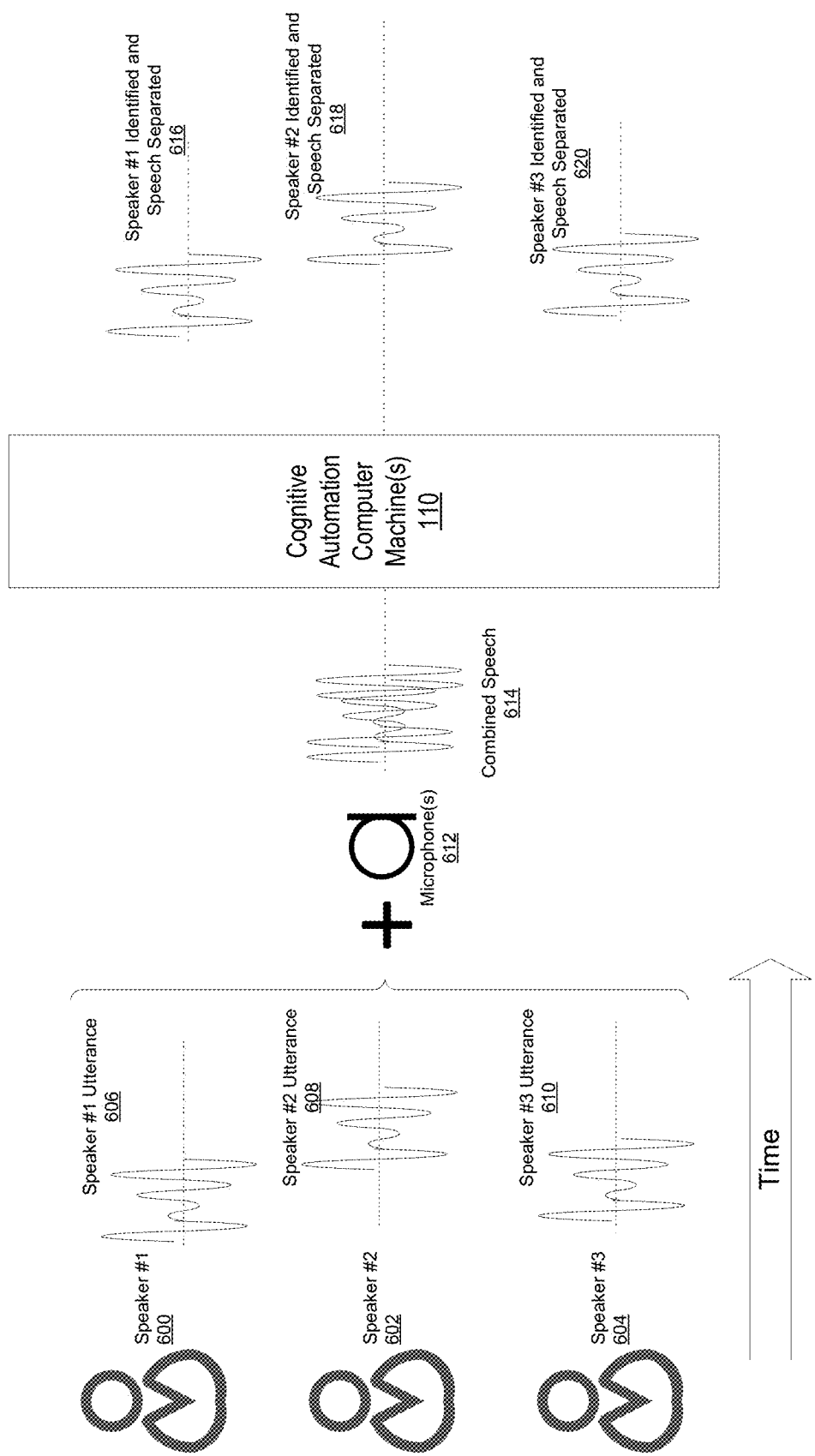
FIG. 6 depicts a sample high-level representation of initial processing of audio by multiple speakers performed by cognitive automation bot(s), in accordance with one or more embodiments.

FIG. 6 illustrates the speech separation functionality of one or more embodiments of this disclosure. Multiple speakers or participants 600, 602, and 604 in a meeting or on a call may be speaking at different times or at the same time. This presents technical transcription problems. In particular, separate statements or utterances can overlap and be recorded by a microphone 612 into a combined speech stream 614. The cognitive automation computer machine(s) 110 can utilize real-time speech analytics to separate each speaker's utterances or statements into separate time-tracked audio streams or files to be separately transcribed.

As an example, assume that there are three speakers 600, 602, 604 in a meeting or on a call who are talking at separate or overlapping time intervals. Each person's statements or utterances 606, 608, and 610 can be received by a telephony device or other microphone at the same time and result in jumbled audio. For example, a first speaker 600 might say "I believe that cognitive automation would handle processing of information and taking actions during telephone calls." A second speaker 602 might say "I think it would work well in meetings too." A third speaker might say "That is a great idea." The combined output, unless fixed by using real-time speech analytics in accordance with the cognitive automation computing machine(s) of embodiments of this disclosure, would receive a combined speech that may have an audio stream consisting of a jumble of statements like: "I believe that cognitive automation would . . . I think it would work well . . . handle processing . . . in meetings too . . . of information and taking actions . . . that is a great idea . . . of information and taking actions during telephone calls." Such a combined stream is useless unless resolved into separate streams. As such, the cognitive automation machine(s) 110 would use real-time speech analytics to identify each separate speaker (such as based on introductions or other pre-seeded data, or simply based on different voice frequencies, pitches, etc.) and separate his/her speech into its own audio stream for further processing.

Referring again to FIG. 5, the cognitive automation computing machine(s) can transcribe each speaker's separately time-tracked utterances or statements in steps 512, 514, and 516. The cognitive automation computing machine(s) 110 can then merge the transcriptions in step 518 into a single transcription stream in which a log or other transcribed text can be provided based on time stamps of when each utterance or statement was made, and can then output the merged stream into a combined output in step 520. The cognitive automation computing machine(s) 110 can store the transcribed combined output in any desired location in step 522 and/or can distribute the combined output to users or machines as appropriate in step 524. The combined output may also be fed back to the cognitive automation machine(s) in step 526 as part of a feedback loop for the cognitive automation machine(s) 110 to take further cognitive automation actions based on the transcribed combined output.

Audio, unstructured data, or other data, such as from the combined output in step 520, can be parsed in step 528 by cognitive automation computing machine(s) 110. In particular, the unstructured data can be processed into components by cognitive automation computing machine(s) 110, which then analyze the data for correct syntax and are then attached by cognitive automation computing machine(s) 110 to tags that define each component. The cognitive automation system (110 or the like) can then process each portion of the data and transform it into machine language if desired. As part of the parsing step, ordinary text can be broken up and used by cognitive automation computing machine(s) 110. For example, search engines typically parse search phrases entered by users so that they can more accurately search for each word. And, the cognitive automation system can parse text documents and extract certain information like names or addresses. Moreover, in the example of a spreadsheet, the cognitive automation system can turn formatted documents into tables with rows and columns by parsing the text.

Next, in step 530, the parsed information can be normalized by cognitive automation computing machine(s) 110. This is a process that breaks down data into record groups for efficient processing. There are typically six stages. By the third stage (third normal form), data are identified only by the key field in their record by cognitive automation computing machine(s) 110. For example, ordering information is identified by cognitive automation computing machine(s) 110 by order number, and customer information by customer number. A major goal of normalization by cognitive automation computing machine(s) 110 is to eliminate redundancy by having a data element represented in only one place. In the context of a database, the normalization by cognitive automation computing machine(s) 110 can involve dividing data into two or more tables and defining relationships between the tables. The objective for the cognitive automation computing machine(s) 110 is to isolate data so that additions, deletions, and modifications of a field can be made in just one table and then propagated by cognitive automation computing machine(s) 110 through the rest of the database via the defined relationships.

Typically, there are there are three main normal forms, each with increasing levels of normalization. The first is a first normal form (1NF), wherein each field in a table contains different information. For example, in an employee list, each table would contain only one birthdate field. In the second normal form (2NF), each field in a table that is not a determiner of the contents of another field must itself be a function of the other fields in the table. In the third normal form (3NF), no duplicate information is permitted. So, for example, if two tables both require a birthdate field, the birthdate information would be separated into a separate table, and the two other tables would then access the birthdate information via an index field in the birthdate table. Any change to a birthdate would automatically be reflect in all tables that link to the birthdate table. Further, additional normalization levels can be utilized such as the Boyce Codd Normal Form (BCNF), fourth normal form (4NF) and fifth normal form (5NF). While normalization makes databases more efficient to maintain, they can also make them more complex because data is separated into so many different tables. Additionally and/or alternatively, the normalization may be considered as a process applied by cognitive automation computing machine(s) 110 to all data in a set that produces a specific statistical property.

If desired, the normalized data can be segmented (not shown) by cognitive automation computing machine(s) 110. This refers to the breaking of packets, by cognitive automation computing machine(s) 110, into smaller pieces in order to overcome the restrictions of network bandwidth and/or limitations in the communication channels. Applicable portions of the segmented data can be joined back together at receivers once distribution and/or dissemination is complete.

Additionally and/or alternatively, the normalized or other data can be validated in step 532 by cognitive automation computing machine(s) 110. The validation can include one or more functions performed by cognitive automation computing machine(s) 110 such as, for example: data validation by ensuring that the data satisfies defined formats and other input criteria; forecast verification by validating and verifying prognostic output from numerical models; regression validation by determining whether the outputs of a regression model are adequate; social validation to verify compliance in a social activity to fit in and be part of the majority; statistical model validation by determining whether the outputs of a statistical model are acceptable; documenting that a process or system meets its predetermined specifications and quality attributes; checking that the segmented and normalized data meets specifications and fulfills its intended purpose; and/or checking the data to confirm that it both is well-formed and follows a defined structure.

After validation in step 532, the validated and normalized data can be received as by systems, data store(s), and/or data source(s) to be updated or otherwise to acted upon or for actions to be taken based on it.

In step 534, the received data can be enriched by cognitive automation computing machine(s) 110. As used herein, data enrichment refers to processes, performed by cognitive automation computing machine(s) 110, that are used to enhance, refine or otherwise improve the received data. This idea and other similar concepts contribute to making data a valuable asset for almost any modern business or enterprise. It also shows the common imperative of proactively using this data in various ways. Although data enrichment can work in many different ways, many of the tools used for this goal involve a refinement of data, by cognitive automation computing machine(s) 110, that might include small errors. A common data enrichment process, implemented by cognitive automation computing machine(s) 110, could, for example, correct likely misspellings or typographical errors in a database through the use of precision algorithms. Following this logic, data enrichment tools could also add information to simple data tables. Another way that data enrichment can work, as used herein, is in extrapolating data. Through methodologies such as fuzzy logic, more information can be produced from a given raw data set. Data enrichment may be implemented based on internal information in the cognitive automation computing machine or based on data contained in internal or external data store such as in step 538.

Relatedly, based on data enrichments in step 534, recommendations may be made or actions taken by the cognitive-automation system 110 in step 536. Such recommendations and/or actions may be stored in step 522 and, if desired, also fed back to the automation computing machine(s) for further actions and/or processing in step 526. And, the cognitive-automation system can learn from each manual intervention in response to recommendations to users and/or interactions, store that information if desired, and then make automatic decisions in the future based on the historical decisions. If desired, optional automation reporting (not shown) by cognitive automation computing machine(s) 110 can generate logs or similar reports for operator, supervisor, or system administrator review and further cognitive-automation refinements.

Figure 7:
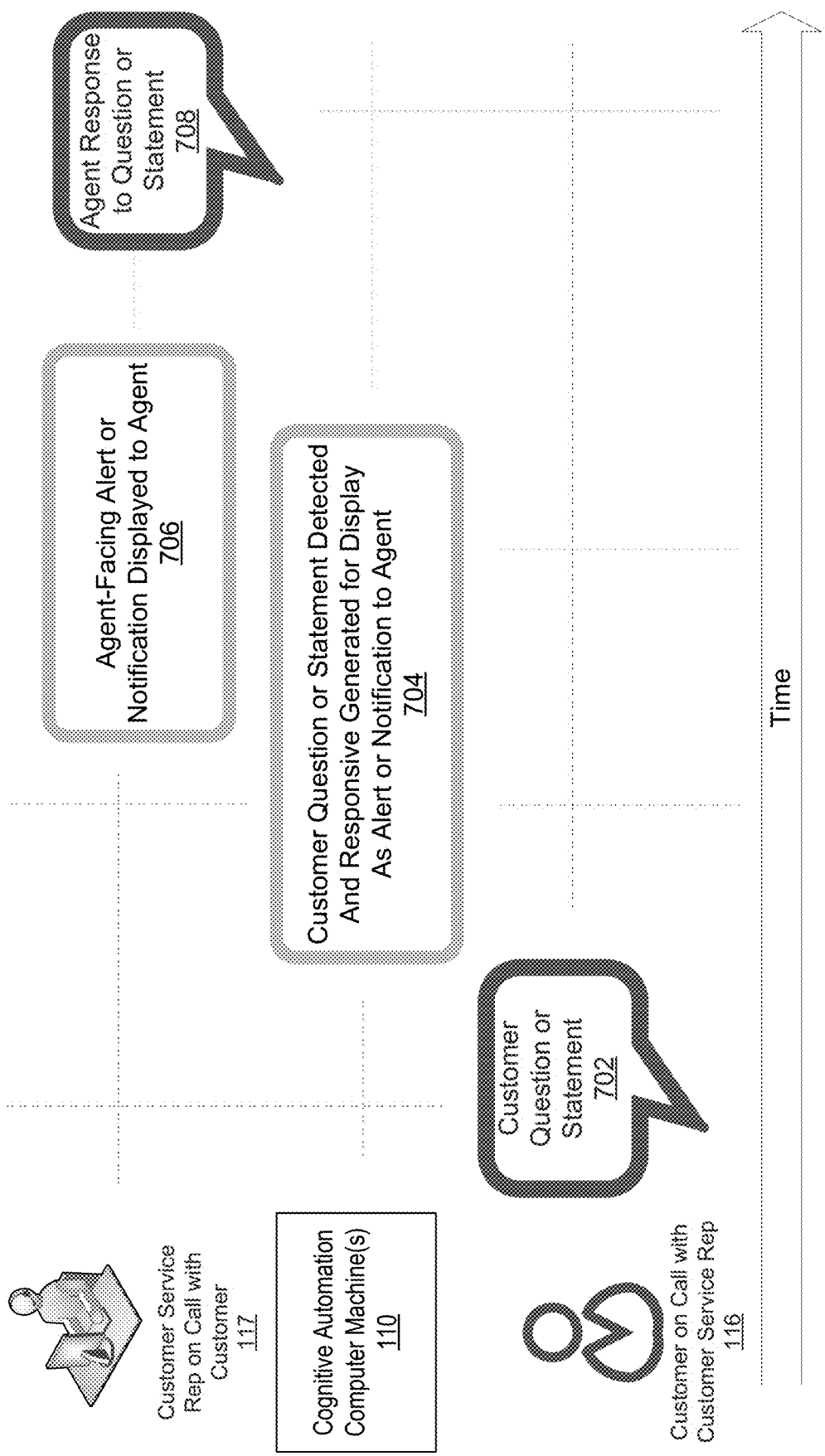
FIG. 7 illustrates sample real-time interaction(s) between a customer, cognitive automation computer machine(s) or bot(s), and a customer service representative.

Practical examples of the foregoing cognitive automation bot functionality can be seen in FIG. 7. A customer 116 may make a statement or ask a question in 702. For example, the speaker may say "I would like to go on a vacation to somewhere warm, maybe the Bahamas. Hopefully the weather there will be good. How much money do I have available in my credit line on my credit card?"

The cognitive automation computing machine(s) could detect the customer speech, analyze it, and take actions/ make recommendations on it in 704. For example, after analyzing the speech, the cognitive automation computing machine could investigate the answers to the questions and research the statements, and could thereafter display in real-time alerts, prompts, or notifications to a customer service representative on his/her computing machine in 706. For example, notifications might say: "Current available credit on account number XXYYZZ is $10,000, a payment is due in seven days and, if payment is made in full on time, the customer will have available credit available of $5,000 for a total available credit of $15,000. The bank has reserved flights available for $1,000 a seat round trip. The weather in the Bahamas is 80 degrees and sunny."

Based on the real-time information displayed in 706 to the agent, the agent is presented with an opportunity to bond and establish a rapport with the customer, the agent is provided with the requested information, and the agent can use the opportunity to up-sell to the customer.

For example, the agent might say in 708: "A vacation to the Bahamas sounds great. The weather there right now is awesome. It is 80 degrees and sunny. Right now, you have $10,000 available on your credit line. If you make your full payment in a couple of days when it is due, you will have a total available credit of $15,000. So, you should have plenty of money for your trip. We can save you some money as well if you'd like to book your airfare with us. Are you interested? We currently have flights available for $1,000 each round trip."

There are many other examples of how real-time feedback and functionality provided by the cognitive automation computing machine(s) 110 would help companies and customers. As a security example to protect against fraud or to prevent elder abuse, a customer might hear a pre-recorded message at the beginning of the call telling the customer to press "0" at any time during the call if he/she believes that the call may be fraudulent, if the customer feels uncomfortable about anything that an agent has said or is asking, or the like. The cognitive automation computing machine(s) 110 could recognize that numerical input and take further action directly with the agent or make an appropriate report to supervisory or other personnel.

As another example, the cognitive automation machine(s) 110 may hear something that an agent says that is inappropriate and immediately notify the agent of such in alert 706 for immediate correction. For example, the customer may be on a no solicitation list. Hence, the upsell opportunity may not be presented to the agent based on what was said by the customer. And, if nonetheless volunteered by an agent during the call, a notice could be displayed telling the agent to apologize and only deal with the available credit question.

In the context of meetings, transcriptions can be provided automatically by the cognitive automation computing machine(s) to each attendee of the meeting by email. The cognitive automation computing machine(s) might, for example, know the identity of each meeting participate based on the attendee list in the calendar appointment. An email distribution list could be set up based on the attendee list by the cognitive automation computing machine(s) 110. At the conclusion of the meeting, the transcriptions could be distributed to everyone who was at the meeting or even those who missed the meeting. If the participants decided to have a follow up meeting at a future date, a calendar appointment could be generated and entered into each person's calendar based on available openings in each person's calendar. Any time conflicts could be identified and avoided. To the extent that there were any action items, the list of action items could be circulated to the attendees or emails might only be sent to each person who had an action item with a list of all assigned items to that person. Task lists for applicable participants could also be updated or created based on the action items.

In another sample scenario in the context of, for example, new inventions invented by inventors, inventors will recognize that the invention process typically begins with a telephone invention disclosure meeting with a patent attorney. The patent attorney and all of the inventors may conduct the disclosure meeting on a telephone conference call.

During the meeting, the patent attorney would likely take copious notes during the call. The inventors may provide their full name as well as their residence and citizenship information, which is required as part of formal papers for the patent application. The meeting notes would likely include a list of everyone on the call, their email addresses, the date of the call, the duration of the call, the title of the invention, a detailed discussion of the inventions, action items to follow up on, a discussion of due dates, known prior art, etc.

The cognitive automation-based engine of one or more embodiments of the present disclosure, such as in cognitive automation computing machine(s) 110, other special purpose computers, and/or client-server machines, infrastructure computing devices or the like could take as an input the audio stream from the meeting, translate and process the information, and propagate it out to various systems thereby obviating the need for repetitive data entry and eliminating the possibility of data entry error.

For example, the cognitive automation-based engine could recognize from the audio stream who the inventors are, their residence, their citizenship, and the title of the invention. This information could be propagated out to a database of inventor declarations and a separate database of inventor assignments. The declarations and assignments could then be automatically created by the cognitive automation-based engine.

Similarly, the cognitive automation-based engine could recognize from the audio stream who the inventors are, their email addresses, residential addresses, etc. and could store that information in a series of contacts for the inventors and create an email distribution list for the inventors. Contacts could be stored in a contact database along with email distribution lists. Automatic reminder emails and follow up emails to the inventors could be populated and sent from an email database. Such emails may include reminders regarding identification of known prior art, reminders to provide additional information or drawings, reminders to execute the formal papers, etc. Other automatic emails, such as distribution of the meeting notes, could be circulated as well.

Relatedly, the cognitive automation-based engine could recognize from the audio stream any future follow-up meetings that are discussed. This information could be propagated to one or more calendar databases and/or calendar invites could automatically be routed to applicable email distribution lists.

In some embodiments, the cognitive automation computing machine(s) may also keep track of locations of customers and customer representatives through geolocating or based on country code or area code information. Information, responses, prompts, and actions from the cognitive automation computing machines may take into account the location of callers. This would be helpful in situations where certain actions or discussions are allowed or preferable in one country or location and inappropriate or undesired in another jurisdiction or geography. This can also help with nuances in translation where words or phrases in one country or location mean something else in another country or location, and/or where there is an enhanced risk of misunderstanding or mistranslation based on local norms and customs.

In some embodiments, the data source(s)/data store(s) may include databases that keep track of key words that may need to be flagged for security or other reasons by the cognitive automation computing machine(s). Whenever such words are transcribed by the cognitive automation computing machine(s), the words or corresponding issues can be flagged to participants and/or supervisors.

In some embodiments, issues in conversations or meetings can be detected and addressed in real-time.

These and many other meeting and telephone call scenarios can be handled with the cognitive automation computing machine(s) 110 of various embodiments of the present disclosure to overcome the technical limitations as noted above.

One or more aspects of the disclosure may be embodied in computer-usable data or computer-executable software or instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer-executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers, computing platforms, and/or one or more networks. The functionality may be distributed in any manner or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A cognitive automation computing platform for processing audio from an audio source containing speech from a plurality of speakers comprising:
   a. a server computing machine having:
      i. at least one server processor;
      ii. at least one server communication interface communicatively coupled to the at least one server processor;
      iii. server memory communicatively coupled to the server communication interface, said server memory storing server computer-readable instructions that, when executed by the at least one server processor, cause the server computing machine to:
         1. acquire, from the audio source via the at least one server communication interface, said audio;
         2. store, in a first server sector of the server memory, the audio;
         3. apply a noise mask, on the audio by the at least one server processor, to create an enhanced audio signal;
         4. store, in a second server sector of the server memory, the enhanced audio signal;
         5. utilize, by the at least one server processor, real-time speech analytics on the enhanced audio signal to separate said speech corresponding to each of said plurality of speakers into a plurality of time-stamped streams;
         6. store, in a third server sector of the server memory, the plurality of time-stamped streams;

7. transcribe, by the at least one server processor, the plurality of time-stamped streams into separate transcriptions corresponding to said plurality of speakers;
8. store, in a fourth server sector of the server memory, the separate transcriptions;
9. merge, by the at least one server processor, the separate transcriptions into a combined output based on the time-stamped streams;
10. store, in a fifth server sector of the server memory, the combined output;
11. parse, by the at least one server processor, the combined output into parsed data by analyzing the combined output for correct syntax;
12. store, in a sixth server sector of the server memory, the parsed data;
13. normalize, by the at least one server processor, the parsed data into normalized data by breaking the parsing data into record groups for efficient processing, said normalized data normalized into at least a first normal form;
14. store, in a seventh server sector of the server memory, the normalized data;
15. validate, by the at least one server processor, the normalized data into validated data to ensure that the validated data satisfies defined formats and input criteria;
16. store, in an eighth server sector of the server memory, the validated data;
17. enrich, by the at least one server processor, the validated data to enriched data that is corrected for any errors;
18. store, in a ninth server sector of the server memory, the enriched data; and
19. perform at least one cognitive automation function, by the at least one server processor, based on the enriched data.

2. The cognitive automation computing platform claim 1 wherein the audio is received, by the at least one server processor, in real-time.

3. The cognitive automation computing platform claim 2 wherein the audio is from a meeting.

4. The cognitive automation computing platform claim 3 wherein said at least one cognitive automation function includes automatically identifying, by the at least one server processor from the enriched data, participants in the meeting.

5. The cognitive automation computing platform claim 4 wherein said at least one cognitive automation function includes creating, by the at least one server processor based on the enriched data, an email distribution list for the identified participants.

6. The cognitive automation computing platform claim 5 wherein said at least one cognitive automation function includes automatically routing, by the at least one server processor over the at least one communication interface, said combined output to said participants by email based on the enriched data.

7. The cognitive automation computing platform claim 6 wherein said at least one cognitive automation function includes automatically identifying, by the at least one server processor based on the enriched data, at least one action item for one of said identified participants.

8. The cognitive automation computing platform claim 7 wherein said at least one cognitive automation function includes automatically routing, by the at least one server processor over the at least one communication interface, said at least one action item to said one of said identified participants by email.

9. The cognitive automation computing platform claim 2 wherein the audio is from a telephone call.

10. The cognitive automation computing platform of claim 9 wherein said at least one cognitive automation function includes automatically generating, by the at least one server processor from the enriched data, a notification corresponding to the telephone call.

11. The cognitive automation computing platform of claim 10 further comprising:
   a. a client computing machine having:
      i. at least one client processor;
      ii. at least one client communication interface communicatively coupled to the at least one client processor;
      iii. at least one client monitor communicatively coupled to the at least one client communication interface;
      iv. client memory communicatively coupled to the client communication interface, said client memory storing client computer-readable instructions that, when executed by the at least one client processor, cause the client computing machine to:
         1. receive, by the at least one client processor over the at least one client communication interface from the at least one server processor via the at least one server communication interface, the notification;
         2. store, in a first client sector of client memory, the notification; and
         3. display, by the at least one client processor on the at least one client monitor, the notification.

12. The cognitive automation computing platform of claim 11 wherein the notification provides account information.

13. The cognitive automation-based platform of claim 11 wherein validation of the normalized data into said validated data is validated, by the at least one server processor, by forecast validation based on prognostic output from at least one numerical model.

14. The cognitive automation-based platform of claim 11 wherein validation of the normalized data into said validated data is validated, by the at least one server processor, by regression validation by determine whether an output of a regression model is adequate.

15. The cognitive automation-based platform of claim 11 wherein validation of the normalized data into said validated data is validated, by the at least one server processor, by social validation to verify compliance in a social activity.

16. The cognitive automation-based platform of claim 11 wherein validation of the normalized data into said validated data is validated, by the at least one server processor, by statistical model validation to determine with outputs of a statistical model are acceptable.

17. The cognitive automation-based platform of claim 11 wherein validation of the normalized data into said validated data is validated, by the at least one server processor, by documenting that a process meets predetermined specifications and fulfills an intended purpose.

18. The cognitive automation-based platform of claim 11 wherein validation of the normalized data into said validated data is validated, by the at least one server processor by checking whether the normalized data follows a defined structure.

19. One or more non-transitory computer-readable media storing instructions that, when executed by a cognitive automation computing platform comprising a plurality of processors in a client-server architecture communicatively coupled over a private network via a plurality of communication interfaces, cause the cognitive automation computing platform to:
- a. receive, by a first of said plurality of processors from a data source, audio;
- b. store, by the first of said plurality of processors in a first sector of the computer-readable media, the audio;
- c. apply a noise mask on the audio, by the first of said plurality of processors, to create an enhanced audio signal;
- d. store, in a second sector of the computer-readable media, the enhanced audio signal;
- e. utilize, by the first of said plurality of processors, real-time speech analytics on the enhanced audio signal to separate said speech corresponding to each said plurality of speakers into a plurality of time-stamped streams;
- f. store, in a third sector of the computer-readable media, the plurality of time-stamped streams;
- g. transcribe, by the first of said plurality of processors, the plurality of time-stamped streams into separate transcriptions corresponding to said plurality of speakers;
- h. store, in a fourth sector of the computer-readable media, the separate transcriptions;
- i. merge, by the first of said plurality of processors, the separate transcriptions into a combined output based on the time-stamped streams;
- j. store, in a fifth sector of the computer-readable media, the combined output;
- k. parse, by the first of said plurality of processors, the combined output into parsed data by analyzing the combined output for correct syntax;
- l. store, in a sixth sector of the computer-readable media, the parsed data;
- m. normalize, by the first of said plurality of processors, the parsed data into normalized data by breaking the parsing data into record groups for efficient processing, said normalized data normalized into at least a first normal form;
- n. store, in a seventh sector of the computer-readable media, the normalized data;
- o. validate, by the first of said plurality of processors, the normalized data into validated data to ensure that the validated data satisfies defined formats and input criteria;
- p. store, in an eighth sector of the computer-readable media, the validated data;
- q. enrich, by the first of said plurality of processors, the validated data to enriched data that is corrected for any errors;
- r. store, in a ninth sector of the computer-readable media, the enriched data;
- s. perform at least one cognitive automation function, by the first of said plurality of processors, to generate a notification based on the enriched data;
- t. store, in a tenth sector of the computer-readable media, the notification;
- u. transmit, from said first of said plurality of processors to a second of said plurality of processors over the private network via said plurality of communication interfaces, the notification; and
- v. display, by the second of said plurality of processors, the notification.

20. A cognitive automation-based method for processing audio from an audio source containing speech from a plurality of speakers comprising the steps of:
- a. receiving, in real-time, by a first of said plurality of processors from a data source, audio;
- b. storing, in real-time, by the first of said plurality of processors in a first sector of the computer-readable media, the audio;
- c. applying a noise mask on the audio, in real-time, by the at least one server processor, to create an enhanced audio signal;
- d. storing, in real-time, in a second sector of the computer-readable media, the enhanced audio signal;
- e. utilizing, in real-time, by the first of said plurality of processors, real-time speech analytics on the enhanced audio signal to separate said speech corresponding to each said plurality of speakers into a plurality of time-stamped streams;
- f. storing, in real-time, in a third sector of the computer-readable media, the plurality of time-stamped streams;
- g. transcribing, in real-time, by the first of said plurality of processors, the plurality of time-stamped streams into separate transcriptions corresponding to said plurality of speakers;
- h. storing, in real-time, in a fourth sector of the computer-readable media, the separate transcriptions;
- i. merging, in real-time, by the first of said plurality of processors, the separate transcriptions into a combined output based on the time-stamped streams;
- j. storing, in real-time, in a fifth sector of the computer-readable media, the combined output;
- k. parsing, in real-time, by the first of said plurality of processors, the combined output into parsed data by analyzing the combined output for correct syntax;
- l. storing, in real-time, in a sixth sector of the computer-readable media, the parsed data;
- m. normalizing, in real-time, by the first of said plurality of processors, the parsed data into normalized data by breaking the parsing data into record groups for efficient processing, said normalized data normalized into at least a first normal form;
- n. storing, in real-time, in a seventh sector of the computer-readable media, the normalized data;
- o. validating, in real-time, by the first of said plurality of processors, the normalized data into validated data to ensure that the validated data satisfies defined formats and input criteria;
- p. storing, in real-time, in an eighth sector of the computer-readable media, the validated data;
- q. enriching, in real-time, by the first of said plurality of processors, the validated data to enriched data that is corrected for any errors;
- r. storing, in real-time, in a ninth sector of the computer-readable media, the enriched data;
- s. performing at least one cognitive automation function, in real-time, by the first of said plurality of processors, to generate a notification based on the enriched data;
- t. storing, in real-time, in a tenth sector of the computer-readable media, the notification;
- u. transmitting, in real-time, from said first of said plurality of processors to a second of said plurality of processors over the private network via said plurality of communication interfaces, the notification; and
- v. displaying, in real-time, by the second of said plurality of processors, the notification.

\* \* \* \* \*